(12) United States Patent
Weisser et al.

(10) Patent No.: US 6,788,639 B2
(45) Date of Patent: Sep. 7, 2004

(54) REPRODUCTION AND/OR RECORDING DEVICE FOR OPTICAL RECORDING MEDIA HAVING A UNIT FOR ADJUSTING THE INCLINATION OF A BEARING

(75) Inventors: Fritz Weisser, Georgen (DE); Rolf Dupper, Villingen-Schwenningen (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 10/046,887

(22) Filed: Jun. 13, 2002

(65) Prior Publication Data

US 2002/0154593 A1 Oct. 24, 2002

Related U.S. Application Data

(63) Continuation of application No. 09/380,224, filed on Mar. 7, 2000, now abandoned.

(51) Int. Cl.$^7$ .......................... G11B 23/00; G11B 25/00
(52) U.S. Cl. ........................................ 369/263; 369/264
(58) Field of Search ................................ 369/264, 263, 369/258, 176, 246, 247; 360/291.2, 291.6, 97.02

(56) References Cited

U.S. PATENT DOCUMENTS

| 3,643,849 | A | * | 2/1972 | Roberts | 242/615.3 |
|---|---|---|---|---|---|
| 4,373,200 | A | * | 2/1983 | Dunlop | 369/263 |
| 4,638,392 | A | * | 1/1987 | Akutsu | 360/130.32 |
| 5,737,304 | A | * | 4/1998 | Soga et al. | 369/247 |
| 5,796,707 | A | * | 8/1998 | Kim | 369/219 |
| 5,859,847 | A | * | 1/1999 | Dew et al. | 370/389 |
| 5,956,314 | A | * | 9/1999 | Ishimatsu et al. | 369/247 |
| 6,125,097 | A | * | 9/2000 | Wu | 369/263 |
| 6,249,504 | B1 | * | 6/2001 | Iwanaga | 369/247 |
| 6,256,288 | B1 | * | 7/2001 | Yamauchi et al. | 369/263 |

FOREIGN PATENT DOCUMENTS

| GB | 2085635 | * | 4/1982 |
|---|---|---|---|
| JP | 62 175933 A | * | 8/1982 |
| JP | 61-150162 A | * | 7/1986 |
| JP | 62 062307 A | * | 3/1987 |
| JP | 61-287027 A | * | 5/1987 |
| JP | 08 017135 A | * | 1/1996 |
| JP | 09 161393 A | * | 6/1997 |
| WO | WO 84/04991 | * | 12/1984 |

* cited by examiner

*Primary Examiner*—Julie Anne Watko
(74) *Attorney, Agent, or Firm*—Joseph S. Tripoli; Carlos M. Herrera; Patricia A. Verlangieri

(57) ABSTRACT

Reproduction and/or recording device for optical recording media having a unit for adjusting the inclination of a bearing, is disclosed. The device includes a unit for adjusting the inclination of a bearing of a laser disk scanning apparatus, which has a board to which the bearing is fastened. The inclination of the bearing can be set with regard to the board by setting units, which alters the distance between the board and the bearing, the selling units each having at least one elastic element, is known. In order to improve the device to the extent that its individual components are inexpensive to produce and the adjustment can be carried out rapidly and in a simple manner, it is provided that the board has at least two elastic lugs, which are connected to the bearing. The inclinations of the lugs can be set with regard to the board by setting units, which act on the lugs.

19 Claims, 3 Drawing Sheets

Figure 1:
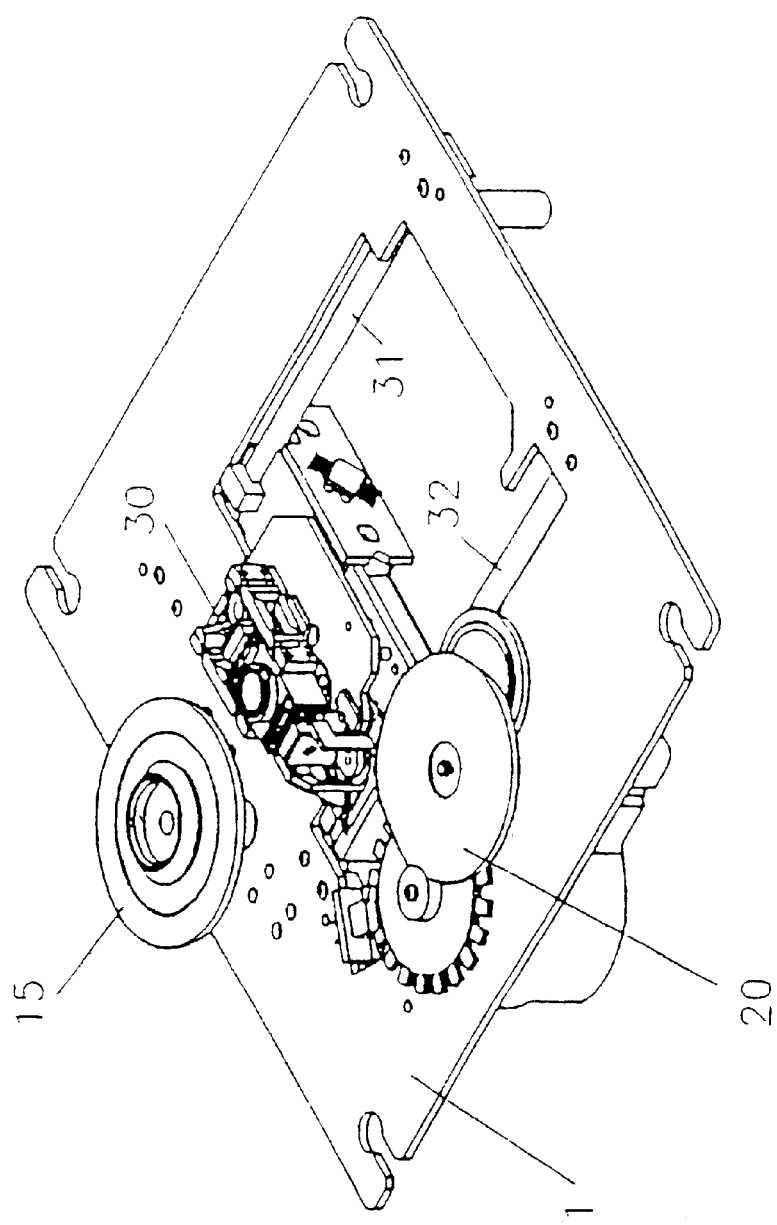

REPRODUCTION AND/OR RECORDING DEVICE FOR OPTICAL RECORDING MEDIA HAVING A UNIT FOR ADJUSTING THE INCLINATION OF A BEARING

CROSS-REFERENCE TO RELATED APPLICATIONS

This application is a continuation of U.S. patent application Ser. No. 09/380,224 filed Mar. 7, 2000, now abandoned.

The invention relates to a reproduction and/or recording device for optical recording media having a unit for adjusting the inclination of a bearing, in particular a bearing of a laser disk scanning apparatus.

Devices of this type require a unit for adjusting the inclination in order to be able satisfactorily to read the information recorded on the optical recording medium, for example a laser disk, because in order to read the information, the laser beam should scan the disk exactly perpendicularly. However, manufacturing tolerances of the disk motor, board and guide rod accommodation always result in a deviation from this required perpendicularity.

JP-A-61-150 162 discloses a generic device having a unit for adjusting the inclination of a motor of a laser disk scanning apparatus, in which the setting means act on three supporting locations of a holder of the motor and respectively interact with a disc spring. In the case of this unit, it is possible to adjust the inclination of the motor (tilt adjustment) by turning the adjusting screws, the disc springs adapting to the height changes in the screws. In this case, the screws necessary for setting have a fairly complicated structure, in particular the screws have two threaded regions and a spherical section which communicates with a conical recess in the board.

Furthermore, JP-A-1-220 225 discloses a device having a unit for adjusting the inclination of the reading unit (pick-up) of a video disk recorders, in which three respective compression springs and screws are used to set the pick-up on the slide. Here, too, the structure of the setting means is relatively complicated and expensive to produce.

Both of the aforementioned devices require the inclination of the motor and/or of the pick-up to be performed via three adjustment points, as a result of which the adjustment is complicated and requires a relatively long time.

The invention is based on the object of improving a reproduction and/or recording device for optical recording media having a unit for adjusting the inclination of a bearing, in particular of a laser disk scanning apparatus, of the abovementioned type, to the extent that its individual components are inexpensive to produce and the adjustment can be carried out rapidly and in a simple manner.

This object is achieved, in the case of a device having the features of the preamble of Patent claim 1, by means of the features specified in the characterising part thereof.

In the inventive device having a unit for adjusting the inclination of a bearing, in particular of a laser disk scanning apparatus, the board has at least two elastic lugs, which are connected to the bearing and whose inclinations can be set with regard to the board by setting means which act on the lugs.

By virtue of the fact that the elastic lugs are connected to the board and the bearing is connected to the lugs at at least two locations, the adjustment of the inclination of the bearing is possible in a simple and rapid manner, since this situation has already obviated the risk of the lugs, which act as elastic elements, being separated from the unit in the event of complete release of the setting means, which would give rise to the risk of these, lugs being lost.

In an advantageous design of the invention, the lugs are integrally connected to the board.

As a result of this refinement, the lugs serving as elastic elements are also not produced as a separate part, thereby enabling production costs to be minimized.

It is furthermore advantageous if the lugs are connected to the board by a web.

The elasticity of the lugs can be predetermined in a simple manner during the production of the board by selection of the width and thickness of the web. The web also enables the lugs to be angled away such that they are located in a different plane from the board, for example in order to be able to accommodate a motor serving as bearing and having connection points which are not situated on one plane.

In a preferred embodiment, the lugs, in their zero position, are located on the same plane as the board.

This has the advantage that the lugs can be formed by simple stamping from the board, and it opens up the possibility of simplifying the adjustment of the motor in that the zero position of the lugs can be monitored visually in a simple manner.

In a preferred embodiment, a respective bridge connected to the board is fitted over the lugs, the bridge carrying the setting means which respectively act on the lugs.

This enables simple fitting of the setting means on the board, since the setting means can be assembled together with the bridges in a preceding manufacturing step, with the result that, to mount the setting means on the board, it is only necessary to fasten the bridge, which is already provided with the setting means, on the board.

It is advantageous if the setting means are threaded screws.

Such threaded screws can be finely regulated during the adjustment of the inclination of the bearing and afford the advantage that reproducible adjustment is possible.

It is advantageous if thread turns for the threaded screws are cut into the bridges.

In this way, by screwing the screw into the bridge, the screw resting on the lug exerts a force which compels the lug to bend in a direction opposite to the screw, thereby altering the inclination of the bearing. By releasing the screw, the return force of the lugs has the effect of achieving an alteration of the inclination of the bearing towards the bridge.

The height of the bridges advantageously corresponds to the region of reversible elasticity of the lugs.

The effect achieved by this is that the lugs cannot be moved so far towards the bridge that there is the risk of the lugs breaking away from the board or of the lugs losing their elasticity.

Thread turns for the threaded screws are advantageously cut into the lugs,

In this way; it is also possible to achieve a controlled alteration of the inclination of the lugs in both directions.

The bearing is preferably connected directly to the board at at least one location.

The effect achieved by this is that the inclination only has to be altered by two adjustment locations, which affords the advantage over adjustment of the inclination of the bearing via three adjustment locations that the adjustment of the inclination of the bearing can be carried out more rapidly and more simply.

The plane of the connection of the bearing to the board is advantageously lower than the plane of the connection of the bearing to the lugs.

As a result, it is already possible to achieve a certain pre-inclination of the bearing before the final adjustment of the inclination of the bearing, this pre-inclination only having to be compensated by adjusting the inclination of the motor via the two lugs. As a result, it becomes possible to effect final adjustment of the inclination of the bearing even more rapidly and more simply.

Developments and advantageous refinements of the invention emerge from the patent claims, the rest of the description and the drawings, which illustrate an exemplary embodiment of the invention.

Figure 2:
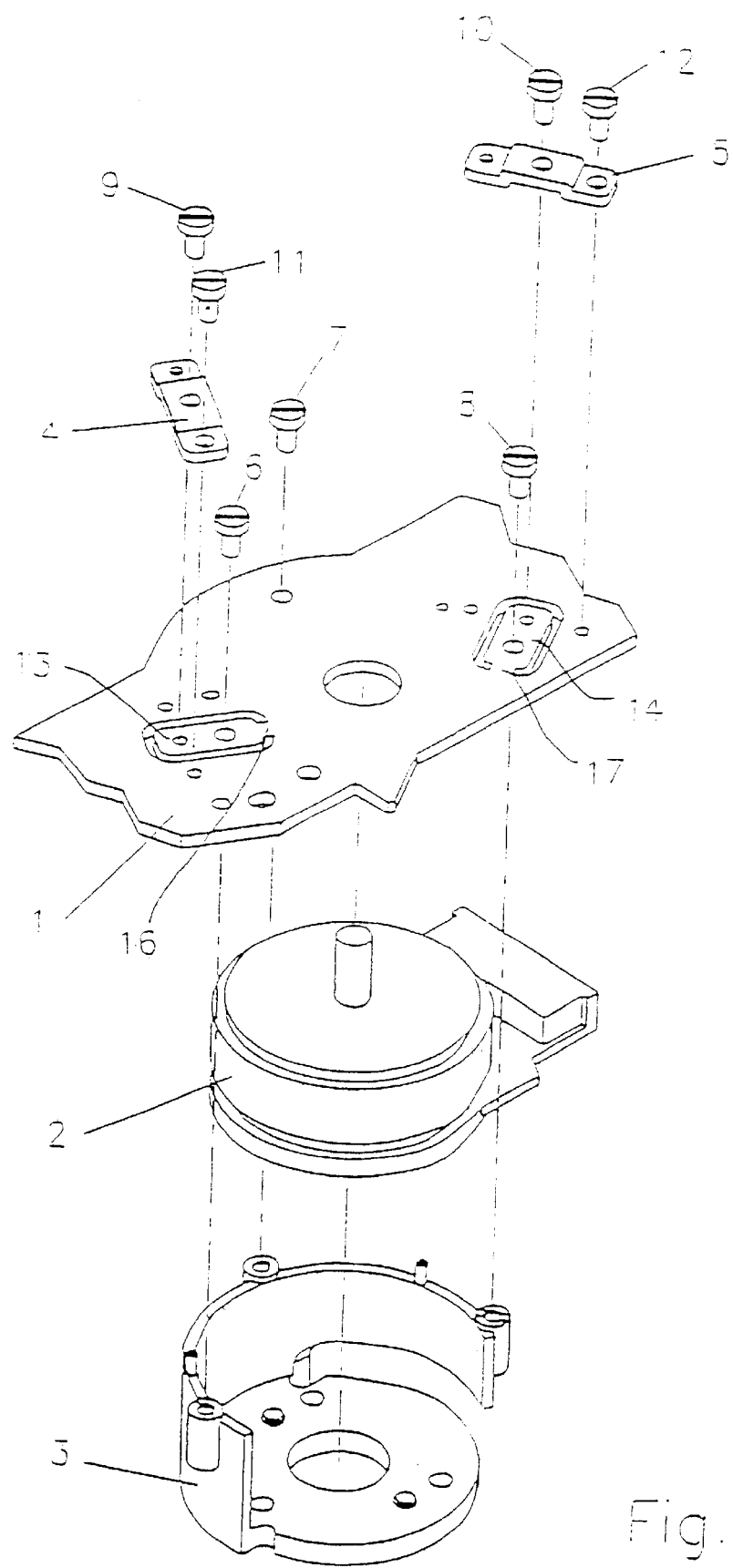
Figure 3:
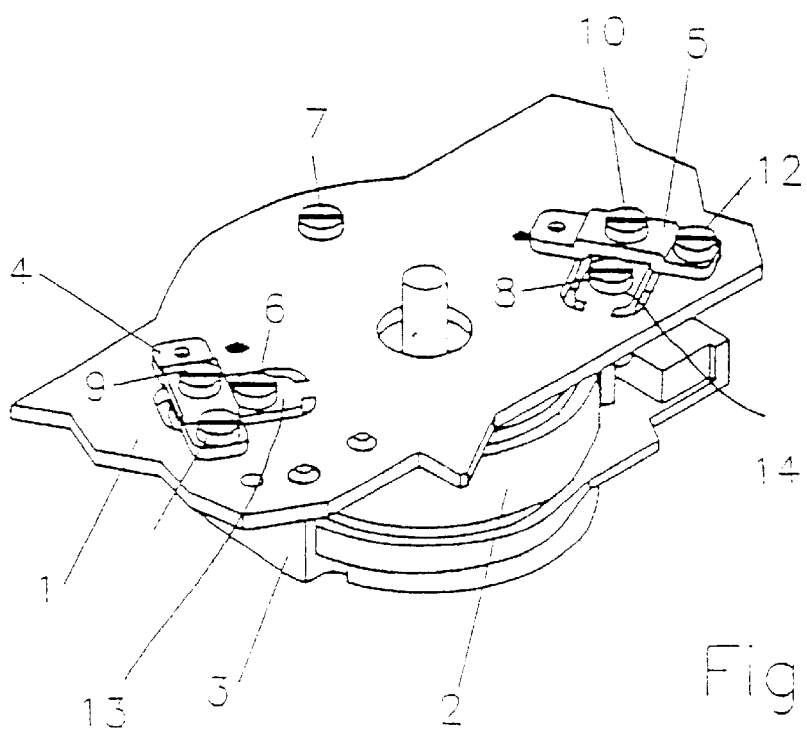
Figure 5:
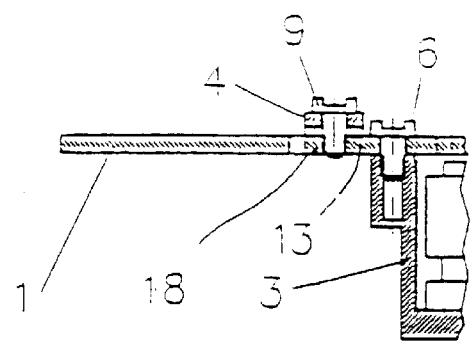
Figure 4:
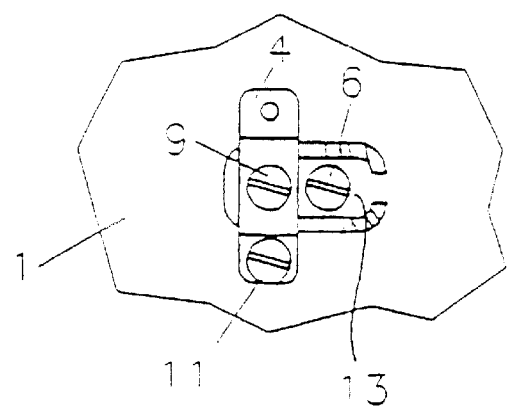

In the drawings:

FIG. 1 shows a perspective illustration of part of an inventive device having a unit for adjusting the inclination of a bearing, in particular of a laser disk scanning apparatus in a drive of a video disk recorder, FIG. 2 shows an exploded drawing of the unit according to the invention, FIG. 3 shows an illustration of part of the unit according to the invention in a perspective view, FIG. 4 shows a detail of the unit according to the invention from above, FIG. 5 shows a partial region of the unit according to the invention in cross-section.

FIG. 1 illustrates a drive of a device according to the invention, whose board 1 carries two guide rods 31 and 32 on which the scanning unit (pick-up) 30 can be displaced by tracking gearing 20. A turntable 15 of a disk motor is suitable for accommodating an optical recording medium, in this case a disk to be read.

FIGS. 2–5 illustrate a partial region of the board 1 with a motor 2 and its holder 3. The motor 2 in this case serves as bearing 2 of the turntable 15. The holder 3 is screwed tightly by a screw 7 to the board 1 and by the screws 8 and 10 to stamped-free lugs 13 and 14 of the board 1. The screwing-on area of the holder 3 onto which the screw 7 is screwed is somewhat lower (approximately 0.1 mm) than the other two screwing-on planes in the exemplary embodiment. This results in a slightly inclined installation position. Via bridges 4 and, 5, which are screwed by screws 11 and 12 to the board 1, the installation position can be set to be exactly perpendicular using adjusting screws 9 and 10. The stamped-free lugs 13 and 14 are in this case adjusted in the elastic region. The height of the bridge is dimensioned such that this region is not exceeded.

The lugs 13 and 14 are connected to the board 1 by webs 16 and 17, the thickness being selected according to the desired elasticity of the lugs 13 and 14.

An external-rotor motor is used in the case described. It is alternatively possible to use other motors which are screwed in directly (without a holder). The points of support can be produced by embossings in the board.

Equally, it is possible for the motor 2 not to serve directly as bearing 2 of the turntable 15, rather for the bearing 2 to be connected to the motor 2 via a gear mechanism.

As illustrated in FIG. 5, the lug 13 has thread turns 18 into which the thread of the setting screw 9 engages.

In brief, the invention concerns a reproduction and/or recording device for optical recording media having a unit for adjusting the inclination of a bearing.

A device having a unit for adjusting the inclination of a bearing 2 of a laser disk scanning apparatus, which has a board 1 to which the bearing 2 is fastened, it being possible to set the inclination of the bearing 2 with regard to the board 1 by setting means which alter the distance between board 1 and bearing 2, the setting means each having at least one elastic element, is known.

In order to improve the device to the extent that its individual components are inexpensive to produce and the adjustment can be carried out rapidly and in a simple manner, it is provided that the board 1 has at least two elastic lugs 13, 14, which are connected to the bearing 2. The inclinations of the lugs 13, 14 can be set with regard to the board 1 by setting means 9, 10 which act on the lugs 13, 14. The invention is applicable for eg. CD-audio, CD-video, CD-ROM and a variety of other optical disk applications such as DVD, MO and others.

What is claimed is:

1. Reproduction or recording device for optical recording media comprising:

a unit for adjusting the orientation between a laser beam and an optical recording medium by adjusting the inclination of a bearing, the unit having a board to which the bearing is fastened, it being possible to set the inclination of the bearing with regard to the board in two different directions by selling means which alter the distance between board and bearing, the selling means each having at least one elastic element, wherein the board has at least two elastic lugs, which are connected to the bearing and whose inclinations can be set with regard to the board by setting means which act on the lugs, the lugs, in their zero position, being located on the same plane as the board.

2. Device according to claim 1, characterized in that a respective bridge connected to the board is filled over the tugs, the bridge carrying the selling means which respectively act on the tugs.

3. Device according to claim 2, characterized in that the setting means are threaded screws.

4. Device according to claim 3, characterized in that thread turns for the threaded screws are cut into the bridges.

5. Device according to claim 3, characterized in that thread turns for the threaded screws are cut into the tugs.

6. Device according to claim 1, characterized in that the lugs are integrally connected to the board.

7. Device according to claim 1, characterized in that the bearing is connected directly to the board in at least one location.

8. Device according to claim 7, characterized in that the plane of the connection of the bearing to the board is lower than the plane of the connection of the bearing to the tugs.

9. Device according to claim 1, characterized in that the lugs are each connected to the board by a web.

10. Reproduction or recording device for optical recording media comprising a unit for adjusting the orientation between a laser beam and an optical recording medium by adjusting the inclination of a bearing, the unit having a board to which the bearing is fastened, it being possible to set the inclination of the bearing with regard to the board in two different directions by setting means which alter the distance between board and bearing, the setting means each having at least one elastic element, wherein the board has at least two elastic lugs which are connected to the bearing and whose inclinations can be set with regard to the board by setting means which act on the lugs, a respective bridge connected to the board being filled over the lugs, the bridge carrying the setting means which respectively act on the lugs.

11. Device according to claim 10, characterized in that the height of the bridges corresponds to the region of reversible elasticity of the lugs.

12. Device according to claim 11, characterized in that the lugs, in their zero position, are located on the same plane as the board.

13. Device according to claim 11, characterized in that the bearing is connected directly to the board in at least one location.

14. Device according to claim 11, characterized in that the lugs are each connected to the board by a web.

15. Device according to claim 10, characterized in that the lugs, in their zero position, are located on the same plane as the board.

16. Device according to claim 10, characterized in that the lugs are integrally connected to the board.

17. Device according to claim 10, characterized in that the setting means are threaded screws.

18. Device according to claim 10, characterized in that the bearing is connected directly to the board in at least one location.

19. Device according to claim 10, characterized in that the lugs are each connected to the board by a web.

* * * * *